No. 746,027. PATENTED DEC. 8, 1903.
L. S. CLARKE.
GEARING.
APPLICATION FILED APR. 3, 1903.
NO MODEL. 2 SHEETS—SHEET 2.
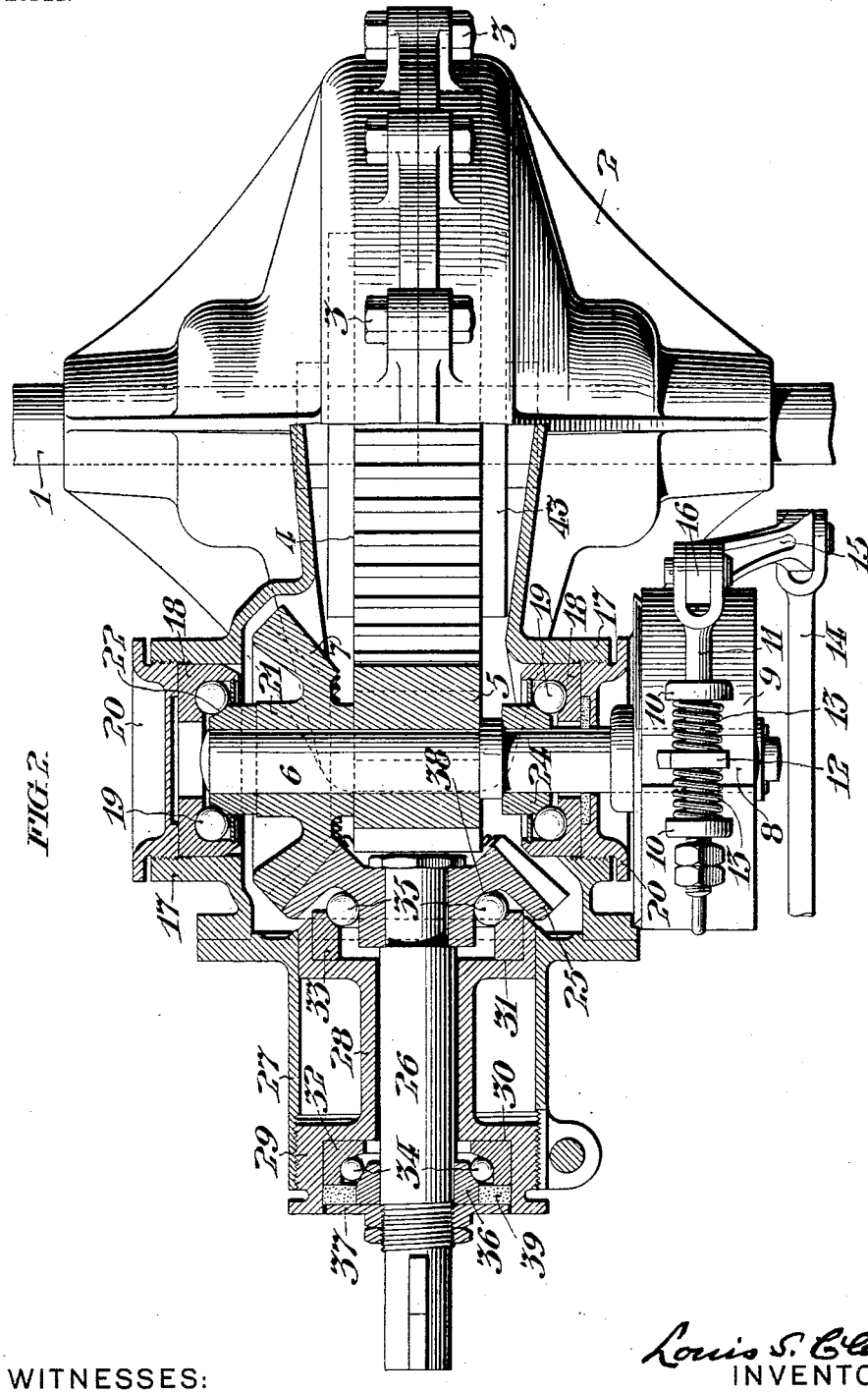
WITNESSES:
INVENTOR:
Louis S. Clarke
By his Attorney No. 746,027. Patented December 8, 1903.

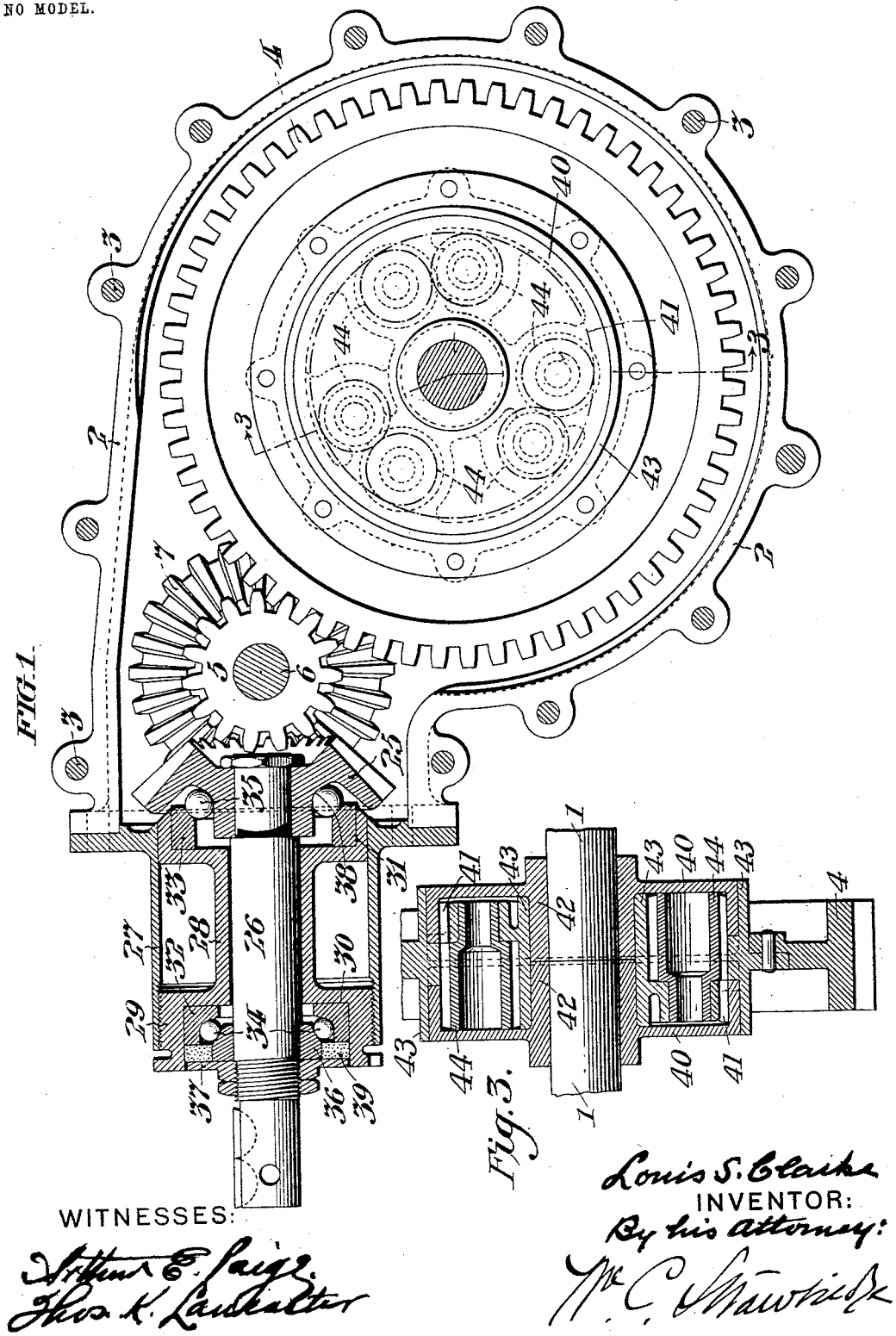

UNITED STATES PATENT OFFICE.

LOUIS S. CLARKE, OF HAVERFORD, PENNSYLVANIA.

GEARING.

SPECIFICATION forming part of Letters Patent No. 746,027, dated December 8, 1903.

Application filed April 3, 1903. Serial No. 150,896. (No model.)

*To all whom it may concern:*

Be it known that I, LOUIS S. CLARKE, a citizen of the United States, residing at Haverford, Montgomery county, State of Pennsylvania, have invented certain new and useful Improvements in Gearing, of which the following is a specification.

This invention relates to an improvement in gearing. It has for its object to provide a simple, compact and efficient gear mechanism for the transmission of power. The said gear mechanism, in its illustrated embodiment, is shown as employed in the transmission of power from a suitable motor, not shown, mounted in a convenient and desirable manner upon the framework of a motor vehicle, to the rear axle of such vehicle; but it is to be understood that the mechanism herein shown may be employed in other relations than that illustrated.

In order that the invention may be more readily understood, reference is to be had to the accompanying drawings, in which, Figure 1 is a longitudinal, vertical sectional view, certain of the parts being shown in elevation.

Figure 2 is a horizontal plan view, certain parts being shown in section.

Figure 3 is a section on the line 3 3 of Figure 1.

In the drawings, 1 designates a rotatable shaft which, in this instance, happens to be the rear axle of a motor vehicle, and upon this shaft is mounted a casing 2 composed of the two symmetrical portions secured together by means of the bolts 3 in a manner clearly shown in the drawings.

The said shaft 1 consists of two parts, the inner ends of which are located within the casing 2 and are connected together through the medium of a suitable equalizing gear mechanism. The equalizing gear mechanism consists of two disks 40 40 provided with internal gear teeth 41. The said disks 40 are connected to the respective adjacent ends of the shaft 1 and are provided with inwardly projecting sleeves 42 on which is mounted a support 43 to which is rigidly secured the spur wheel 4, as is clearly shown in Figures 1 and 3 of the drawings.

A series of pinions 44 separated into three pairs or couples are carried by the support 43. One half of the said pinions engage the internal gear teeth 41 of one of the disks 40, and the other half of said pinions engage the other disk 40, and the inner ends of each pair of pinions engage or mesh with each other, as is indicated in dotted lines in Figure 1 of the drawings, and when the vehicle is traveling in a straight line and the rear wheels thereof are each rotating with the same speed, the equalizing gear mechanism will rotate bodily and there will be no relative movement between the two members or parts of the shaft 1; but when the vehicle is turning, it is obvious that one member of the shaft 1 can rotate relatively to the other by reason of the engagement of the internal gear teeth of the disks 40 with the small pinions 44.

The spur wheel 4 is adapted to mesh with a spur wheel 5, rigidly mounted upon the main or drive shaft 6 of the gear mechanism. As illustrated, the diameter of the spur wheel 4 is substantially four times that of the spur wheel 5, but it is to be understood that the relative diameters may be altered to such proportions as may be regarded desirable.

7 is a bevel wheel also mounted and rigidly secured upon the drive shaft 6, at one end thereof, and upon the opposite end of said drive shaft 6 is mounted a disk or wheel 8 which is adapted to coöperate with a brake band 9, which is composed of two parts hinged together underneath the said disk, the hinged or pivoted connection between the two parts not being shown. It will readily be understood that the said band may be a single, continuous piece, or, on the other hand, said brake band may consist of two separate parts hinged at separate points upon a stationary part or bracket extending out from the casing to a position beneath the said disk 8.

The brake band is provided with lugs 10, having holes therethrough in which is slidably mounted a rod 11; the said rod also extends loosely through a stationary bracket 12 located intermediate the said lugs 10.

Coiled about the said rod 11 are two wire springs 13, respectively located between the said bracket and the respective lugs upon the said brake band. The brake band is caused to grasp the disk wheel 8 by means of a pull rod 14 which is connected to one end of a lever 15, the latter being pivoted intermediate its ends to lugs, not shown, which extend from one side of the brake band, the opposite end of said lever being pivotally connected at 16 to one end of the rod 11, as is clearly shown in Figure 2 of the drawings. It will be understood that the pull rod is connected to mechanism located in a position to be conveniently operated by a person guiding the vehicle.

The respective sides of the casing 2 are provided with boxings or boxes 17, within which are located annular ball races 18, for the ball bearings 19.

The said ball races are secured and held in position by means of the screw-threaded face plates 20, which are screwed into the screw-threaded ends of the said boxes or boxings. 21 designates the hub of the bevel wheel 7 which is mounted upon the main or drive shaft 6. Also mounted upon the shaft 6 and in contact with the hub 21 is a cone 22, for the ball bearings 19, the said ball bearings occupying a position between the said cone 22 and the annular ball race secured in one of the said boxes 17.

The ball bearings 19, mounted upon the other end of the shaft, are located between the ball races 18, and the cone 24 mounted upon the said shaft, and secured to rotate therewith.

The main or drive shaft 6 may be adjusted longitudinally by simultaneously rotating the face plates 20 so as to cause them to move bodily in the same direction; that is to say, by rotating one of the said plates to the right and simultaneously rotating the other plate to the left. By this means, the spur wheels 4 and 5 may be brought into accurate mesh and alinement, also the bevel wheel 7, mounted upon the said drive shaft 6, may be brought into accurate mesh with the bevel pinion 25 mounted upon the rear end of the shaft 26, which extends forwardly to the engine or motor, not shown.

It is obvious that by simultaneously rotating each of the said face plates to the right or to the left and by rotating either of said plates alone to the right or left, the ball bearings will be tightened or loosened.

27 is a boxing secured to the forward portion of the casing 2. Within the said boxing is an annular casing 28 having a screw threaded portion 29 in engagement with screw threads formed upon the inside of the outer hollow end of the said boxing. Each of the ends of the said casing 28 is provided with right angled annular seats 30 and 31, within which are seated annular ball races 32 and 33, for the ball bearings 34 and 35, the former resting upon the cone 36 secured upon the shaft 26 so as to have longitudinal movement thereon. The cone bearing 36 may be adjusted longitudinally of the shaft 26 by means of the face plate 37 which has screw-threaded engagement with the shaft 26 as shown in the drawings, and the face plate may be held in adjusted position by a locknut, as shown.

The ball bearings 35 are seated within a depression 38 formed in the rear face of the bevel pinion 25 as clearly illustrated. The annular ball races 32 and 33 and the cone 36 may be adjusted longitudinally in the direction desired upon the shaft 26 by proper adjustment of the casing 28 and the face plate 37.

39 designates a dust ring located between the face plate 37 and the ball race way 32, the said ring consisting of a suitable material, for instance felt, and its purpose is to exclude dust from the ball bearings 34.

It is to be understood that I do not desire to be restricted to the precise construction and arrangement of the parts which I have described and illustrated in the drawings, as it is obvious that changes may be made without departing from the spirit of my invention. For instance, the drive shaft 6 and with it the gear wheels carried thereby, the bevel pinion 25 and the rear end of the shaft 26, may all be elevated to a higher position so that the spur wheel 5 will mesh with the spur wheel 4 at any point above the present position of engagement to the top of the said spur wheel 4, or, on the other hand, the aforesaid parts may be moved to a lower position so that the spur wheel 5 will mesh with the spur wheel 4 at any point below the present position of engagement to the bottom of said spur wheel 4.

Having thus described my invention, I claim—

1. In combination, a driven element, a casing supported on said element, a driving element supported on said casing, a gear connection between said elements, and a brake mechanism associated with said driving element and adapted to retard and control its movement.

2. In combination, a driven element, a casing supported on said element, a driving element supported on said casing, a gear connection between said elements, a brake disk rigidly secured to and adapted to move in unison with the said driving element, and a friction device adapted to co-operate with said brake disk to retard and control the movement of the driving element.

3. In combination, a driven element, a casing supported on said element, a driving element supported on said casing, a gear connection between said elements, a brake disk secured to and adapted to move in unison with said driving element, a brake band substantially surrounding said brake disk, and means for occasioning a clamping action of said brake band about the said disk to retard and control the movement of the said driving element.

4. In combination, a driven shaft, a casing supported on said shaft, a gear-wheel located within said casing and connected to said shaft and adapted to rotate therewith, a driving shaft supported by the said casing and arranged in parallel relation to the driven shaft, a power transmission shaft arranged at right angles to the said shafts, and gear connection between said power transmission shaft and said spur wheel.

5. In combination, a driven shaft consisting of two parts having adjacent ends connected together by suitable means, a casing supported on said shaft, a spur wheel located within said casing and connected to the said shaft, a driving shaft supported by said casing, a power transmission shaft, gear connection between said power transmission shaft and said spur wheel, and means for adjusting the said gear connection.

6. In combination, a driven shaft consisting of two parts having adjacent ends which are connected together by any suitable means, a casing supported on said shaft, a spur wheel located within said casing and connected to said shaft, and adapted to rotate therewith, a driving shaft supported by said casing, a spur wheel rigidly secured to said drive shaft and engaging the spur wheel connected to the said driven shaft, a bevel wheel also secured on the said drive shaft, to rotate therewith, a power transmission shaft and a bevel pinion secured thereon and engaging the said bevel wheel.

7. In combination, a driven shaft consisting of two parts having adjacent ends, a casing supported on said shaft, an equalizing gear mechanism located within said casing and connecting the said adjacent ends, a gear wheel located within said casing and secured to the equalizing gear mechanism and adapted to rotate with the said driven shaft, a driving shaft supported by the said casing and arranged in parallel relation to the driven shaft, a power transmission shaft arranged at right angles to the said shafts, and a gear connection between said power transmission shaft and said spur wheel.

8. In combination, a driven shaft consisting of two parts having adjacent ends, a casing supported on said shaft, an equalizing gear mechanism located within said casing and connecting the said adjacent ends, a gear wheel located within said casing and secured to the equalizing gear mechanism and adapted to rotate with the said driven shaft, a driving shaft supported by said casing, a power transmission shaft, gear connection between said power transmission shaft and said spur wheel, and means for adjusting the said gear connection.

9. In combination, a driven shaft consisting of two parts having adjacent ends, a casing supported on said shaft, an equalizing gear mechanism located within said casing and connecting the said adjacent ends, a spur wheel located within said casing and secured to the equalizing gear mechanism and adapted to rotate with the said driven shaft, a drive shaft supported in said casing, a spur wheel rigidly secured to said drive shaft and engaging the spur wheel secured to the equalizing gear mechanism, a bevel wheel also secured to said drive shaft to rotate therewith, a power transmission shaft, and a bevel pinion secured thereon and engaging the said bevel wheel.

10. In combination, a shaft, a spur wheel secured to said shaft to rotate therewith, a casing supported on said shaft, boxes located on the respective sides of said casing, annular ball races supported in said boxes, ball bearings mounted in said races, adjustable cap plates connected to said boxes for adjusting said races, a shaft supported upon said ball bearings, a spur wheel secured on the latter shaft, a bevel wheel secured on said last mentioned shaft, and a bevel pinion in engagement with said bevel wheel.

11. In combination, a shaft, a spur wheel secured to said shaft to rotate therewith, a casing supported on said shaft, boxes located on the respective sides of said casing, annular ball races secured in said boxes, a shaft, the ends of which extend into said boxes, ball bearings seated in said ball races and which support the last named shaft, gear wheels mounted on the latter shaft, and means for simultaneously adjusting the annular ball races and the shaft and gears supported thereon.

12. In combination, a shaft, a spur wheel secured to said shaft to rotate therewith, a casing supported on said shaft, boxes located on the respective sides of said casing, annular ball races secured in said boxes, a shaft, the ends of which extend into said boxes, ball bearings seated in said ball races and which support the last named shaft, gear wheels mounted on the latter shaft, and means for simultaneously adjusting the annular ball races and the shaft and gears supported thereon, said means comprising cap plates having screw-threaded connection with the said boxes and engaging the outer side of the annular ball races.

In testimony that I claim the foregoing as my invention I have hereunto signed my name this 18th day of March, A. D. 1903.

LOUIS S. CLARKE.

In presence of—
  THOMAS SHIELDS CLARKE,
  JAMES KING CLARKE.